United States Patent
Atanassov et al.

(10) Patent No.: US 9,485,495 B2
(45) Date of Patent: Nov. 1, 2016

(54) AUTOFOCUS FOR STEREO IMAGES

(75) Inventors: Kalin M. Atanassov, San Diego, CA (US); Sergiu R. Goma, San Diego, CA (US); Vikas Ramachandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/205,481

(22) Filed: Aug. 8, 2011

(65) Prior Publication Data

US 2012/0033051 A1    Feb. 9, 2012

Related U.S. Application Data

(60) Provisional application No. 61/371,979, filed on Aug. 9, 2010, provisional application No. 61/489,231, filed on May 23, 2011.

(51) Int. Cl.
| | | |
|---|---|---|
| H04N 13/02 | (2006.01) | |
| G06K 9/00 | (2006.01) | |
| G06T 7/00 | (2006.01) | |
| H04N 13/00 | (2006.01) | |

(52) U.S. Cl.
CPC ......... *H04N 13/0239* (2013.01); *G06T 7/0075* (2013.01); *H04N 13/0296* (2013.01); *G06T 2207/10012* (2013.01); *H04N 2013/0081* (2013.01)

(58) Field of Classification Search
CPC ........... H04N 13/021; H04N 13/0438; H04N 13/0217; H04N 13/0296; H04N 5/145; G06T 2207/10016; G06T 7/20; G06T 7/2033; G06T 7/2053

USPC ........................................ 348/42–60; 382/107
See application file for complete search history.

(56) References Cited

U.S. PATENT DOCUMENTS

| | | |
|---|---|---|
| 4,114,171 A | 9/1978 | Altman |
| 4,437,745 A | 3/1984 | Hajnal |
| 4,639,586 A | 1/1987 | Fender et al. |
| 4,740,780 A | 4/1988 | Brown et al. |
| 4,751,570 A | 6/1988 | Robinson |

(Continued)

FOREIGN PATENT DOCUMENTS

| | | |
|---|---|---|
| CN | 101201459 A | 6/2008 |
| CN | 101581828 A | 11/2009 |

(Continued)

OTHER PUBLICATIONS

International Search Report and Written Opinion—PCT/US2011/047126—ISA/EPO—Oct. 26, 2011.

(Continued)

*Primary Examiner* — Dave Czekaj
*Assistant Examiner* — Tsion B Owens
(74) *Attorney, Agent, or Firm* — Knobbe Martens Olson & Bear LLP

(57) ABSTRACT

Present embodiments contemplate systems, apparatus, and methods to determine an appropriate focal depth for a sensor based upon a pair of stereoscopic images. Particularly, certain of the embodiments contemplate determining keypoints for each image, identifying correlations between the keypoints, and deriving object distances from the correlations. These distances may then be used to select a proper focal depth for one or more sensors.

38 Claims, 9 Drawing Sheets

(56) References Cited

U.S. PATENT DOCUMENTS

| | | |
|---|---|---|
| 5,012,273 A | 4/1991 | Nakamura et al. |
| 5,016,109 A | 5/1991 | Gaylord |
| 5,063,441 A | 11/1991 | Lipton et al. |
| 5,142,357 A | 8/1992 | Lipton et al. |
| 5,194,959 A | 3/1993 | Kaneko et al. |
| 5,207,000 A | 5/1993 | Chang et al. |
| 5,231,461 A | 7/1993 | Silvergate et al. |
| 5,243,413 A | 9/1993 | Gitlin et al. |
| 5,313,542 A | 5/1994 | Castonguay |
| 5,475,617 A | 12/1995 | Castonguay |
| 5,539,483 A | 7/1996 | Nalwa |
| 5,606,627 A | 2/1997 | Kuo |
| 5,614,941 A | 3/1997 | Hines |
| 5,640,222 A | 6/1997 | Paul |
| 5,642,299 A | 6/1997 | Hardin et al. |
| 5,686,960 A | 11/1997 | Sussman et al. |
| 5,721,585 A | 2/1998 | Keast et al. |
| 5,734,507 A | 3/1998 | Harvey |
| 5,745,305 A | 4/1998 | Nalwa |
| 5,793,527 A | 8/1998 | Nalwa |
| 5,903,306 A | 5/1999 | Heckendorn et al. |
| 5,926,411 A | 7/1999 | Russell |
| 5,990,934 A | 11/1999 | Nalwa |
| 6,111,702 A | 8/2000 | Nalwa |
| 6,115,176 A | 9/2000 | Nalwa |
| 6,128,143 A | 10/2000 | Nalwa |
| 6,141,145 A | 10/2000 | Nalwa |
| 6,144,501 A | 11/2000 | Nalwa |
| 6,195,204 B1 | 2/2001 | Nalwa |
| 6,219,090 B1 | 4/2001 | Nalwa |
| 6,285,365 B1 | 9/2001 | Nalwa |
| 6,356,397 B1 | 3/2002 | Nalwa |
| 6,611,289 B1 | 8/2003 | Yu et al. |
| 6,628,897 B2 | 9/2003 | Suzuki |
| 6,650,774 B1 | 11/2003 | Szeliski |
| 6,700,711 B2 | 3/2004 | Nalwa |
| 6,701,081 B1 | 3/2004 | Dwyer et al. |
| 6,768,509 B1 | 7/2004 | Bradski et al. |
| 6,775,437 B2 | 8/2004 | Kazarinov et al. |
| 6,798,406 B1 | 9/2004 | Jones et al. |
| 6,809,887 B1 | 10/2004 | Gao et al. |
| 6,850,279 B1 | 2/2005 | Scherling |
| 6,855,111 B2 | 2/2005 | Yokoi et al. |
| 6,861,633 B2 | 3/2005 | Osborn |
| 7,006,123 B2 | 2/2006 | Yoshikawa et al. |
| 7,039,292 B1 | 5/2006 | Breiholz |
| 7,084,904 B2 | 8/2006 | Liu et al. |
| 7,116,351 B2 | 10/2006 | Yoshikawa |
| 7,215,479 B1 | 5/2007 | Bakin |
| 7,253,394 B2 | 8/2007 | Kang |
| 7,271,803 B2 | 9/2007 | Ejiri et al. |
| 7,336,299 B2 | 2/2008 | Kostrzewski et al. |
| 7,612,953 B2 | 11/2009 | Nagai et al. |
| 7,710,463 B2 | 5/2010 | Foote |
| 7,805,071 B2 | 9/2010 | Mitani |
| 7,817,354 B2 | 10/2010 | Wilson |
| 7,893,957 B2 | 2/2011 | Peters et al. |
| 7,961,398 B2 | 6/2011 | Tocci |
| 8,004,557 B2 | 8/2011 | Pan |
| 8,098,276 B2 | 1/2012 | Chang et al. |
| 8,115,813 B2 | 2/2012 | Tang |
| 8,139,125 B2 | 3/2012 | Scherling |
| 8,228,417 B1 | 7/2012 | Georgiev et al. |
| 8,267,601 B2 | 9/2012 | Campbell et al. |
| 8,284,263 B2 | 10/2012 | Oohara et al. |
| 8,294,073 B1 | 10/2012 | Vance et al. |
| 8,356,035 B1 * | 1/2013 | Baluja .............. G06F 17/30247 707/741 |
| 8,400,555 B1 | 3/2013 | Georgiev et al. |
| 8,482,813 B2 | 7/2013 | Kawano et al. |
| 8,791,984 B2 | 7/2014 | Jones et al. |
| 8,988,564 B2 | 3/2015 | Webster et al. |
| 9,316,810 B2 | 4/2016 | Mercado |
| 2001/0028482 A1 | 10/2001 | Nishioka |
| 2002/0070365 A1 | 6/2002 | Karellas |
| 2002/0136150 A1 | 9/2002 | Mihara et al. |
| 2003/0024987 A1 | 2/2003 | Zhu |
| 2003/0038814 A1 | 2/2003 | Blume |
| 2003/0214575 A1 | 11/2003 | Yoshikawa |
| 2004/0021767 A1 | 2/2004 | Endo et al. |
| 2004/0066449 A1 | 4/2004 | Givon |
| 2004/0105025 A1 | 6/2004 | Scherling |
| 2004/0183907 A1 | 9/2004 | Hovanky et al. |
| 2004/0246333 A1 | 12/2004 | Steuart et al. |
| 2004/0263611 A1 | 12/2004 | Cutler |
| 2005/0053274 A1 | 3/2005 | Mayer et al. |
| 2005/0057659 A1 | 3/2005 | Hasegawa |
| 2005/0081629 A1 | 4/2005 | Hoshal |
| 2005/0111106 A1 | 5/2005 | Matsumoto et al. |
| 2005/0185711 A1 | 8/2005 | Pfister et al. |
| 2005/0218297 A1 | 10/2005 | Suda et al. |
| 2006/0023074 A1 | 2/2006 | Cutler |
| 2006/0023106 A1 | 2/2006 | Yee et al. |
| 2006/0023278 A1 | 2/2006 | Nishioka |
| 2006/0140446 A1 | 6/2006 | Luo et al. |
| 2006/0193509 A1 | 8/2006 | Criminisi et al. |
| 2006/0215054 A1 | 9/2006 | Liang et al. |
| 2006/0215903 A1 | 9/2006 | Nishiyama |
| 2006/0238441 A1* | 10/2006 | Benjamin .......... H04N 13/0429 345/8 |
| 2007/0024739 A1 | 2/2007 | Konno |
| 2007/0058961 A1 | 3/2007 | Kobayashi et al. |
| 2007/0064142 A1* | 3/2007 | Misawa ............... H04N 5/2253 348/333.01 |
| 2007/0085903 A1 | 4/2007 | Zhang |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0088702 A1 | 4/2008 | Linsenmaier et al. |
| 2008/0117289 A1* | 5/2008 | Schowengerdt ...... G02B 26/005 348/46 |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1* | 1/2009 | Au ..................... H04N 1/32144 382/100 |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0085846 A1* | 4/2009 | Cho ..................... G09G 5/363 345/87 |
| 2009/0096994 A1 | 4/2009 | Smits |
| 2009/0153726 A1 | 6/2009 | Lim |
| 2009/0160931 A1 | 6/2009 | Pockett et al. |
| 2009/0268983 A1 | 10/2009 | Stone et al. |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1* | 8/2010 | Heitz ................... G06T 7/0075 382/154 |
| 2010/0232681 A1 | 9/2010 | Fujieda et al. |
| 2010/0259655 A1 | 10/2010 | Takayama |
| 2010/0265363 A1 | 10/2010 | Kim |
| 2010/0278423 A1 | 11/2010 | Itoh et al. |
| 2010/0289878 A1* | 11/2010 | Sato ................... H04N 13/0239 348/46 |
| 2010/0290703 A1 | 11/2010 | Sim et al. |
| 2010/0302396 A1 | 12/2010 | Golub et al. |
| 2010/0309286 A1 | 12/2010 | Chen et al. |
| 2010/0309333 A1* | 12/2010 | Smith ................... H04N 5/235 348/230.1 |
| 2011/0001789 A1 | 1/2011 | Wilson et al. |
| 2011/0007135 A1 | 1/2011 | Okada et al. |

(56) References Cited

U.S. PATENT DOCUMENTS

| | | |
|---|---|---|
| 2011/0009163 A1 | 1/2011 | Fletcher et al. |
| 2011/0012998 A1* | 1/2011 | Pan .................... H04N 5/23212 348/47 |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0304764 A1 | 12/2011 | Shigemitsu et al. |
| 2012/0008148 A1 | 1/2012 | Pryce et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0249750 A1* | 10/2012 | Izzat .................... G06T 7/0022 348/47 |
| 2012/0249815 A1 | 10/2012 | Bohn et al. |
| 2012/0269400 A1* | 10/2012 | Heyward ............... H04N 5/145 382/107 |
| 2012/0281072 A1* | 11/2012 | Georgiev ............... G03B 11/00 348/49 |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0070055 A1 | 3/2013 | Atanassov et al. |
| 2013/0141802 A1 | 6/2013 | Yang |
| 2013/0222556 A1 | 8/2013 | Shimada |
| 2013/0229529 A1 | 9/2013 | Lablans |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0335598 A1 | 12/2013 | Gustavsson et al. |
| 2013/0335600 A1 | 12/2013 | Gustavsson et al. |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1 | 4/2014 | Georgiev et al. |
| 2014/0139623 A1 | 5/2014 | McCain et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2015/0049172 A1 | 2/2015 | Ramachandra et al. |
| 2015/0070562 A1 | 3/2015 | Nayar et al. |
| 2015/0125092 A1 | 5/2015 | Zhuo et al. |
| 2015/0177524 A1 | 6/2015 | Webster et al. |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0370040 A1 | 12/2015 | Georgiev |
| 2015/0371387 A1 | 12/2015 | Atanassov |
| 2015/0373252 A1 | 12/2015 | Georgiev |
| 2015/0373262 A1 | 12/2015 | Georgiev |
| 2015/0373263 A1 | 12/2015 | Georgiev |
| 2015/0373268 A1 | 12/2015 | Osborne |
| 2015/0373269 A1 | 12/2015 | Osborne |
| 2015/0373279 A1 | 12/2015 | Osborne |
| 2016/0085059 A1 | 3/2016 | Mercado |
| 2016/0127646 A1 | 5/2016 | Osborne |

FOREIGN PATENT DOCUMENTS

| | | |
|---|---|---|
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | H089424 A | 1/1996 |
| JP | H08125835 A | 5/1996 |
| JP | 8194274 A | 7/1996 |
| JP | H08242453 A | 9/1996 |
| JP | 2001194114 A | 7/2001 |
| JP | 2003304561 A | 10/2003 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | H0847001 A | 9/2008 |
| JP | 2010041381 A | 2/2010 |
| JP | 2010067014 A | 3/2010 |
| JP | 2010128820 A | 6/2010 |
| JP | 2010524279 A | 7/2010 |
| WO | WO-9321560 A1 | 10/1993 |
| WO | WO-9847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

Narkhede, et al., "Stereoscopic Imaging: A Real-Time, In Depth Look", IEEE Potentials, Feb./Mar. 2004, vol. 23, Issue 1, pp. 38-42.

Hoff, et al., "Surfaces from Stereo: Integrating Feature Matching Disparity Estimation, and Contour Detection", IEEE Transactions on Pattern Analysis and Machine Intelligence, vol. 11, No. 2, Feb. 1989.

Arican, et al., "Intermediate View Generation for Perceived Depth Adjustment of Sterio Video", Mitsubishi Electric Research Laboratories, http://www.merl.com, TR2009-052, Sep. 2009.

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Murphy M., et al., "Lens Drivers Focus on Performance in High-Resolution Camera Modules," Analog Dialogue, Nov. 2006, vol. 40, pp. 1-3.

Ricoh Imagine Change: "New RICOH THETA Model, Capturing 360-degree Images in One Shot, is on Sale Soon—Spherical Video Function, API and SDK (Beta Version)", News Release, Oct. 28, 2014, 3 pages.

Shuchun Y., et al., "Preprocessing for stereo vision based on LOG filter", Proceedings of 2011 6th International Forum on Strategic Technology, Aug. 2011, XP055211077, pp. 1074-1077.

Sun W.S., et al., "Single-Lens Camera Based on a Pyramid Prism Array to Capture Four Images," Optical Review, 2013, vol. 20 (2), pp. 145-152.

Hao M., et al., "Object Location Technique for Binocular Stereo Vision Based on Scale Invariant Feature Points", SIFT, Journal of Harbin Engineering University, Jun. 2009, vol. 30, No. 6 pp. 649-653.

Kawanishi T., et al., "Generation of High-Resolution Stereo Panoramic Images by Omnidirectional Imaging Sensor Using Hexagonal Pyramidal Mirrors", Pattern Recognition, 1998, Proceedings, Fourteenth International Conference on Brisbane, QLD., Australia

(56) References Cited

OTHER PUBLICATIONS

Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.

Tan K-H., et al., "Multiview Panoramic Cameras Using a Pyramid", Omnidirectional Vision, 2002 Proceedings, Third Workshop on Jun. 2, 2002, Piscataway, NJ, USA,IEEE Jan. 1, 2002 (Jan. 1, 2002), pp. 87-93, XP010611080, ISBN: 978-0-7695-1629-5.

* cited by examiner

AUTOFOCUS FOR STEREO IMAGES

CLAIM OF PRIORITY UNDER 35 U.S.C. §119

The present Application for Patent claims priority to U.S. Provisional Patent Application Ser. No. 61/371,979, entitled "INSTANTANEOUS AUTOFOCUS FROM STEREO IMAGES," filed Aug. 9, 2010; and U.S. Provisional Patent Application Ser. No. 61/489,231, entitled "AUTOFOCUS FOR STEREO IMAGES," filed on May 23, 2011, which applications are incorporated by reference herein.

TECHNICAL FIELD

The present embodiments relate to stereoscopic image capture, and in particular, to methods, apparatus and systems for determining an appropriate focal depth for a stereoscopic image capture device.

BACKGROUND

Stereopsis is the process by which the human brain interprets an object's depth based on the relative displacement of the object as seen from the left and right eyes. The stereoscopic effect may be artificially induced by taking first and second images of a scene from first and second laterally offset viewing positions and presenting the images separately to each of the left and right eyes. By capturing a succession of stereoscopic image pairs in time, the image pairs may be successively presented to the eyes to form a stereoscopic movie that appears to the user as having three-dimensions.

Two traditional cameras may be used to acquire each of the images of a stereoscopic image pair. A traditional camera may be properly focused using an autofocus procedure which captures a plurality of images at different focal depths. The focal depth corresponding to the highest frequency content is then used for subsequent image captures. Traditional movie cameras may use this method to autofocus during video capture. However, the capture of frames will need to be periodically delayed while the autofocus functionality is performed.

While suitable for capturing 2D images with a single traditional camera, this autofocus technique may be unsuitable for stereoscopic image capture. In particular, the technique may disrupt the video stream and may be affected by camera movement, such as by the user's hand motions.

SUMMARY

Certain embodiments contemplate a method in an electronic device for determining a focal depth for an image sensor. They method may comprise: receiving a first image associated with a first viewpoint; receiving a second image associated with a second viewpoint; determining a first plurality of keypoints based on the first image; correlating keypoints from the first plurality of keypoints with positions in the second image; determining a plurality of disparities associated with each of the first plurality of keypoints; and determining a focal depth based upon the plurality of disparities, the position of the first viewpoint and the position of the second viewpoint.

In certain embodiments, the method may further comprise determining a second plurality of keypoints based on the second image. In some embodiments, correlating keypoints from the first plurality of keypoints with positions in the second image comprises correlating keypoints from the first plurality of keypoints with keypoints from the second plurality of keypoints. In some embodiments, correlating keypoints from the first plurality of keypoints with positions in the second image comprises iterating over pixels within a search range in the second image. In some embodiments, correlating keypoints from the first plurality of keypoints with positions in the second image comprises determining the mean square error between pixels in the first image and the second image. In some embodiments, determining a first plurality of keypoints based on the first image comprises determining Scale Invariant Feature Transform (SIFT) keypoints based on the first image. In some embodiments, determining a first plurality of keypoints based on the first image comprises sub-sampling the first image, applying a high-pass filter to the first image, calculating the power of the first image, and thresholding the first image. In some embodiments, correlating keypoints from the first plurality of keypoints with positions in the second image occurs in realtime. In some embodiments, the electronic device comprises a mobile phone.

Certain embodiments contemplate a computer readable medium comprising instructions configured to cause a computer to perform the steps of: receiving a first image associated with a first viewpoint; receiving a second image associated with a second viewpoint; determining a first plurality of keypoints based on the first image; correlating keypoints from the first plurality of keypoints with positions in the second image; determining a plurality of disparities associated with each of the first plurality of keypoints; and determining a focal depth based upon the plurality of disparities, the position of the first viewpoint and the position of the second viewpoint.

In some embodiments, the instructions are also configured to cause the processor to determine a second plurality of keypoints based on the second image. In some embodiments, correlating keypoints from the first plurality of keypoints with positions in the second image comprises correlating keypoints from the first plurality of keypoints with keypoints from the second plurality of keypoints. In some embodiments, correlating keypoints from the first plurality of keypoints with positions in the second image comprises iterating over pixels within a search range in the second image. In some embodiments, correlating keypoints from the first plurality of keypoints with positions in the second image comprises determining the mean square error between pixels in the first image and the second image. In some embodiments, determining a first plurality of keypoints based on the first image comprises determining Scale Invariant Feature Transform (SIFT) keypoints based on the first image. In some embodiments, determining a first plurality of keypoints based on the first image comprises sub-sampling the first image, applying a high-pass filter to the first image, calculating the power of the first image, and thresholding the first image. In some embodiments, correlating keypoints from the first plurality of keypoints with positions in the second image occurs in realtime. In some embodiments, the computer is located in a mobile phone.

Certain embodiments contemplate a system for focusing a stereoscopic capture device. The system may comprise a first image sensor configured to generate a first image associated with a first viewpoint; a second image sensor configured to generate a second image associated with a second viewpoint; a feature generation module configured to determine a first plurality of keypoints based on the first image; a keypoint correlation module configured to correlate keypoints from the first plurality of keypoints with positions in the second image; a disparity determination module configured to determine a plurality of disparities associated with each of the first plurality of keypoints; and a depth determination module configured to determine a focal depth based upon the plurality of disparities, the position of the first viewpoint and the position of the second viewpoint.

In some embodiments, the feature generation module may be configured to determine a second plurality of keypoints based on the second image. In some embodiments, the software module configured to correlate keypoints is configured to correlate keypoints from the first plurality of keypoints with keypoints from the second plurality of keypoints. In some embodiments, the software module configured to correlate keypoints is configured to iterate over pixels within a search range in the second image. In some embodiments, correlating keypoints from the first plurality of keypoints with positions in the second image comprises determining the mean square error between pixels in the first image and the second image.

In some embodiments, the feature generation module is configured to determine Scale Invariant Feature Transform (SIFT) keypoints based on the first image. In some embodiments, the feature generation module is configured to sub-sample the first image, apply a high-pass filter to the first image, calculate the power of the first image, and threshold the first image.

In some embodiments, the software module configured to correlate keypoints correlates keypoints from the first plurality of keypoints with positions in the second image in realtime. In some embodiments, the stereoscopic capture device is located on a mobile phone. In some embodiments, the software module configured to determine a focal depth comprises a disparity histogram.

Certain embodiments contemplate a system for focusing a stereoscopic capture device, the system comprising: means for receiving a first image associated with a first viewpoint; means for receiving a second image associated with a second viewpoint; means for determining a first plurality of keypoints based on the first image; means for correlating keypoints from the first plurality of keypoints with positions in the second image; means for determining a plurality of disparities associated with each of the first plurality of keypoints; and means for determining a focal depth based upon the plurality of disparities, the position of the first viewpoint and the position of the second viewpoint.

In some embodiments the means for receiving a first image comprises a first sensor, the means for receiving a second image comprises a second sensor, the means for determining a first plurality of keypoints comprises a feature generation module, the means for correlating comprises a keypoint correlation module, the means for determining a plurality of disparities comprises a disparity determination module, and the means for determining a focal depth comprises a depth determination module. In some embodiments, the means for determining a first plurality of keypoints is configured to determine a second plurality of keypoints based on the second image. In some embodiments, the means for correlating keypoints from the first plurality of keypoints with positions in the second image is configured to correlate keypoints from the first plurality of keypoints with keypoints from the second plurality of keypoints. In some embodiments, the means for correlating keypoints from the first plurality of keypoints with positions in the second image is configured to iterate over pixels within a search range in the second image. In some embodiments, the means for correlating keypoints from the first plurality of keypoints with positions in the second image is configured to determine the mean square error between pixels in the first image and the second image. In some embodiments, the means for determining a first plurality of keypoints is configured to determine Scale Invariant Feature Transform (SIFT) keypoints based on the first image. In some embodiments, the means for determining a first plurality of keypoints is configured to sub-sample the first image, apply a high-pass filter to the first image, calculate the power of the first image, and threshold the first image. In some embodiments, the means for correlating keypoints correlates the keypoints from the first plurality of keypoints with positions in the second image in realtime. In some embodiments, the stereoscopic capture device is located on a mobile phone.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Embodiments relate to systems and methods of determining or setting configuration data in a stereoscopic camera. In one embodiment, the configuration data relates to the proper focal length of the two lenses of the stereoscopic camera. In one embodiment, a first camera receives a first image from a scene and a second camera receives a second image of the same scene. A set of keypoints are determined from analysis of the first image. The keypoints, can be, for example, Keypoints may comprise any data structure which can be consistently replicated from a portion of an image and thereby permit unique identification of the image portion. In some embodiments, a keypoint may comprise a plurality of pixels corresponding to a portion of an image. The keypoint may be associated with a position in the image. After determining a keypoint in the first image, the system looks for a similar position in the second image. Once the similar position in the second image is identified, the system calculates the difference between the keypoints in the first image, and the corresponding position in the second image. This allows the system to determine the focal depth of the scene by knowing the disparity between the same keypoint positions in both frames, along with the positions of the stereoscopic lenses.

Present embodiments contemplate systems, apparatus, and methods to determine an appropriate focal depth for a sensor based upon at least a pair of stereoscopic images. Particularly, certain of the embodiments contemplate determining keypoints for each image, identifying correlations between the keypoints, and deriving object distances from the correlations. One skilled in the art will recognize that these embodiments may be implemented in hardware, software, firmware, or any combination thereof. The stereoscopic system may be implemented on a wide range of electronic devices, including mobile wireless communication devices, personal digital assistants (PDAs), laptop computers, desktop computers, digital cameras, digital recording devices, and the like.

Figure 1:
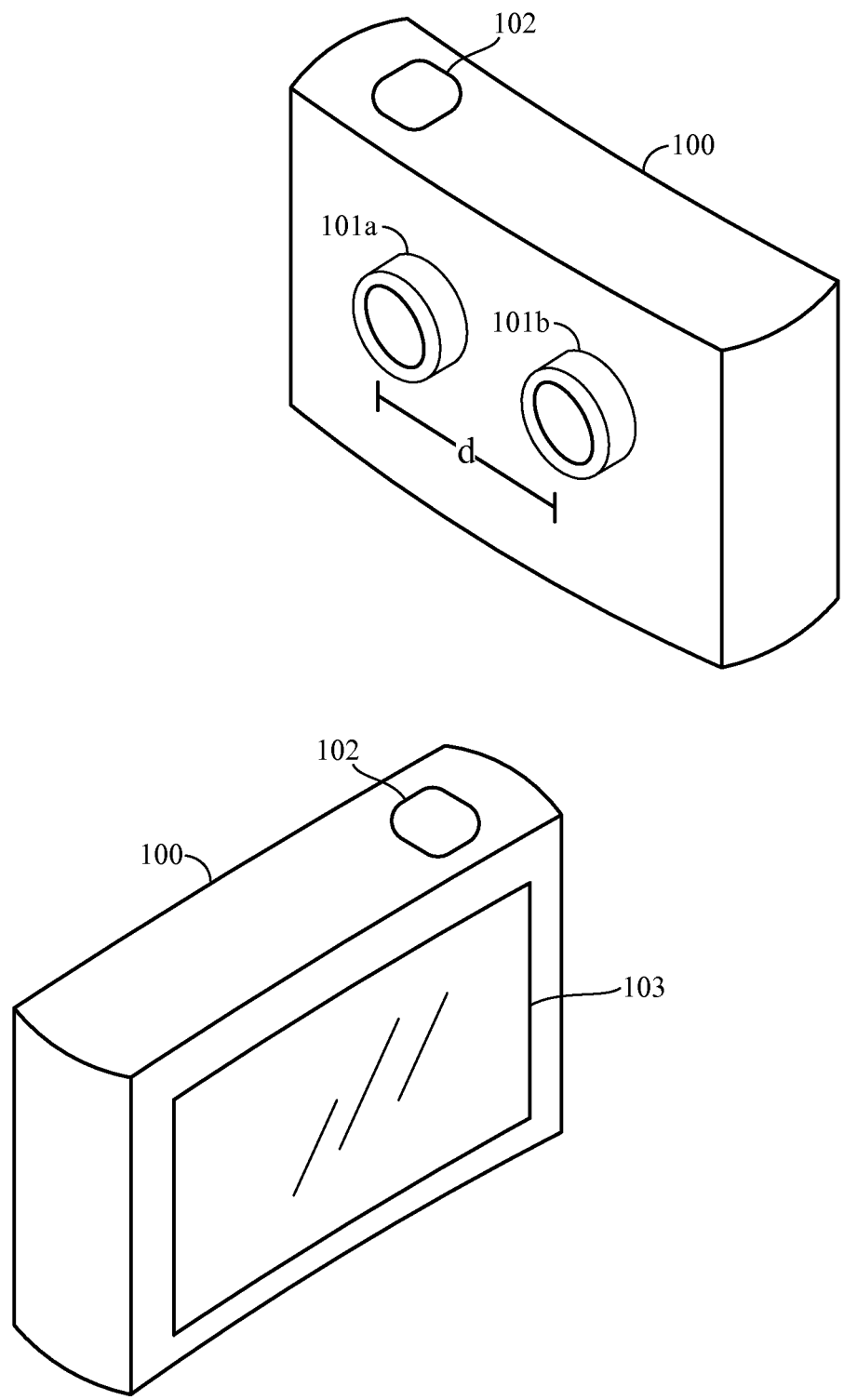
FIG. 1 is a generalized diagram depicting one possible mobile device comprising a sensor arrangement facilitating the capture of stereoscopic images.

FIG. 1 depicts a mobile device 100 comprising a sensor arrangement facilitating the capture of stereoscopic images, or other means for receiving an image. Such a device may be a mobile phone, personal digital assistant, gaming device, or the like. The device 100 may comprise a first sensor 101a and a second sensor 101b separated by a distance d. The device may also comprise user input controls 102 and a display 103. In some embodiments, the sensors 101a and 101b may be situated such that they are horizontally, but not vertically, offset when the users holds device 100 so as to capture a stereoscopic picture or movie.

Although this particular device depicts two sensors 101a and 101b one skilled in the art may readily conceive of a stereoscopic image capture device which comprises more or less than two image sensors. For example, a device with only a single sensor may operate in combination with a series of lenses or reflecting surfaces to acquire two images at the positions of sensors 101a and 101b in rapid succession. This arrangement would likewise be able to acquire a stereoscopic image pair for use with the methods described below and the single sensor could be focused accordingly. Thus, the methods and systems discussed in this application will be applicable to any system which acquires two images from a first and second viewpoint, so long as those viewpoints facilitate a stereoscopic depiction of the image scene. Thus, reference to a pair of image sensors should not be considered to exclude the possibility of a single image sensor receiving images from two viewpoints.

Figure 2:
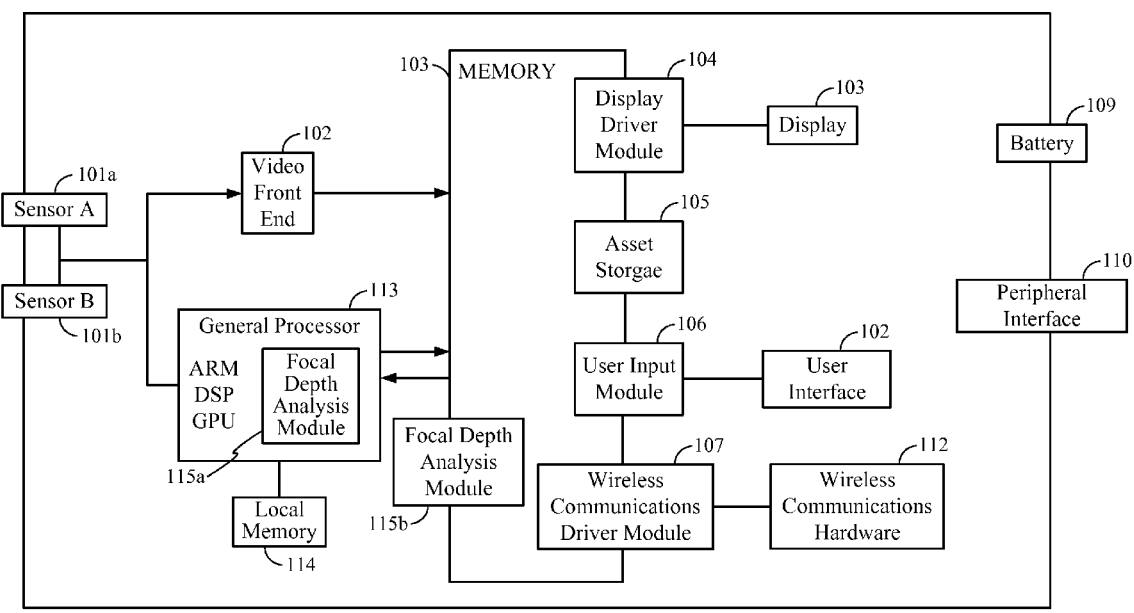
FIG. 2 is a block diagram of certain of the components in a mobile device, such as the mobile device of FIG. 1.

FIG. 2 is a block diagram of certain of the components in a mobile device, such as the mobile device 100 depicted in FIG. 1. Sensor 101a receives a first image of the stereoscopic image pair and sensor 101b receives a second image of the stereoscopic image pair. In some embodiments, the sensors may receive the images simultaneously. The device may comprise a video front end 102 and memory 103. Video front end 102 may process incoming raw image data from sensors 101a and 101b and store the data in memory 103. Memory 103 may also comprise various applications and software drivers for the mobile device 100. For example, a display driver module 104 may be in communication with the display 103. A user input module 106 may similarly be in communication with a user interface 102. A wireless communication driver module 107 may be in communication with wireless communications hardware 112.

The memory may also be in communication with a General Processor 113. The General Processor 113 may comprise sub-processing units, or subprocessors, such as an Advanced RISC Machine (ARM), digital signal processor (DSP), or graphical processing unit (GPU). These processors may communicate with local memory 114 when handling various operations.

Certain of the present embodiments contemplate the addition of a "Focal Depth Analysis Module" 115a, 115b to the system architecture. In some embodiments, the module may take the form of a dedicated processor 115a, or a portion of a processor located on the general processor. In some embodiments the module may comprise software code 115b stored in a computer readable medium such as memory 103. Some embodiments may place portions of the module at a dedicated processor 115a and memory 115b as firmware, or as a software-hardware combination. In some embodiments, the module may reside at any location in FIG. 2 which permits access to a feature generation system, such as a SIFT feature generation system, and to sensors 101a and 101b. Thus, the module may take advantage of preexisting hardware or software configured for feature generation and/or detection. One skilled in the art will recognize that the embodiments described below could be implemented using a subprocessor on the General Processor 113, or could be stored as a separate application in memory 103. In some embodiments the SIFT feature generation system may be found in software, whereas in other embodiments the SIFT feature generation system may be found in hardware.

Figure 3:
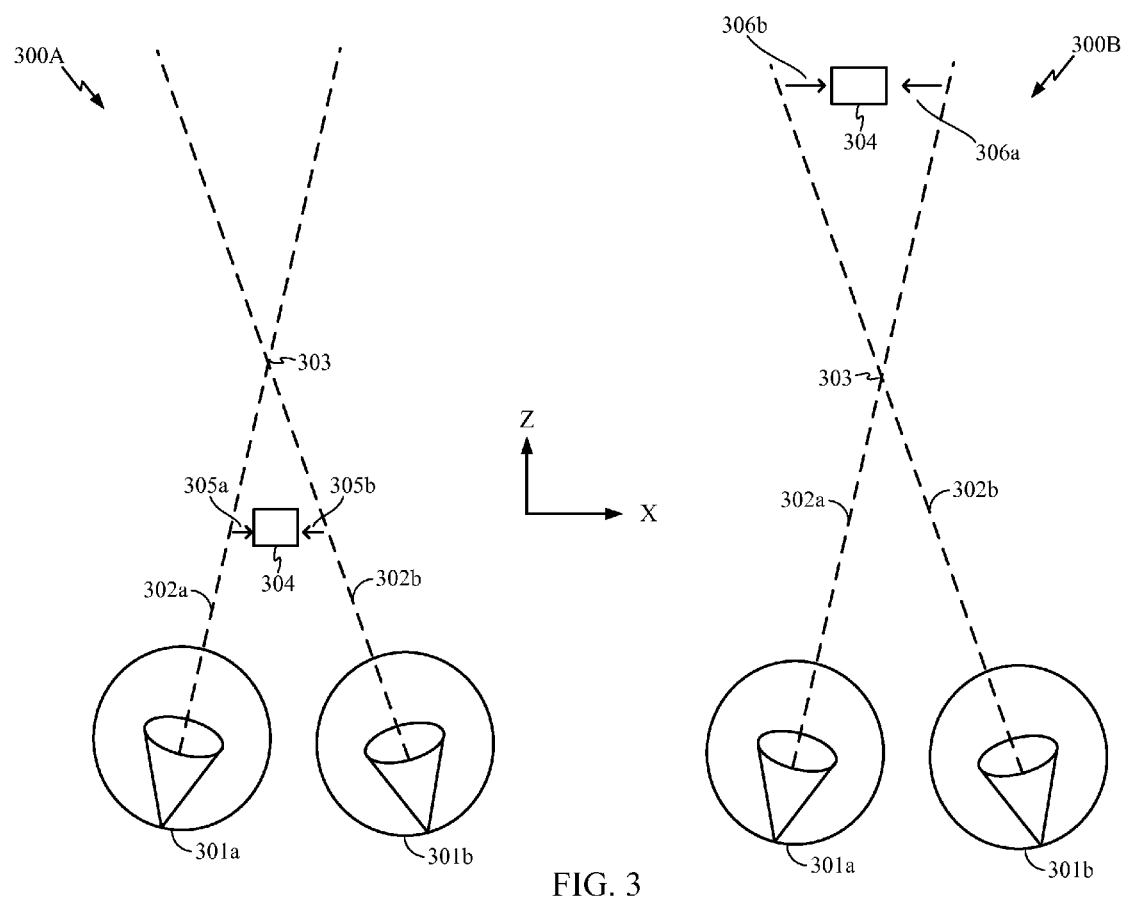
FIG. 3 depicts the capturing of an object at a first and second position using a stereo pair of capture devices.

Certain of the present embodiments provide auto-focus functionality which takes advantage of geometric properties of stereoscopic image capture. FIG. 3 depicts, via a top-down view, the stereoscopic image capture of an object 304 at a first position 300a and second position 300b using a stereoscopic camera arrangement. A first image capture device 301a may be located at a first position laterally separated from a second capture device 301b located at a second position. The first capture device 301a may capture a first image of the scene from the first position and the second capture device 301b may capture a second image of the scene from the second position. The first and second images will accordingly be associated with first and second viewpoints of the scene based on the positions and orientations of capture devices 301a and 301b. Object 304 may appear in both images. In some embodiments, capture device 301a and capture device 301b may be the same as sensors 101a and 101b of FIG. 1 respectively. Capture devices 301a, 301b may be calibrated to have no vertical disparity and to possess fairly close focal distances.

The center of device 301a's viewpoint passes along line 302a. Similarly, the center of device 301b's viewpoint passes along line 302b. These two centerlines intersect at the position 303. As mentioned, the object 304 appears in each of the first and second images. With regard to position 300a, however, the object 304 appears to the right of centerline 302a, by an amount 305a and to the left of centerline 302b by an amount 305b. Conversely, in position 300b, the object 304 appears to the left of centerline 302a by an amount 306a, and to the right of centerline 302b, by an amount 306b. In this manner, the relative position of the object in the z-direction is reflected by the relative displacement in each of the left and right images.

Object disparity may be defined as the difference between an object's position in the first image as compared to the object's position in the second image. Where there is no vertical disparity between the capture devices, the disparity may comprise only the lateral offset from the position in one image to the position in another. One may arbitrarily take the disparity as the difference between the left and right, or right and left images. For the purposes of this description, the disparity is defined as the position of the object in the image from sensor 301*b* minus the position of the object in the image from sensor 301*a* (with the x-direction positive as indicated in FIG. 3). Thus, negative disparity results from the depiction of object 304 in the position 300*a* and positive disparity results from the depiction of object 304 in the position 300*b*.

Figure 4:
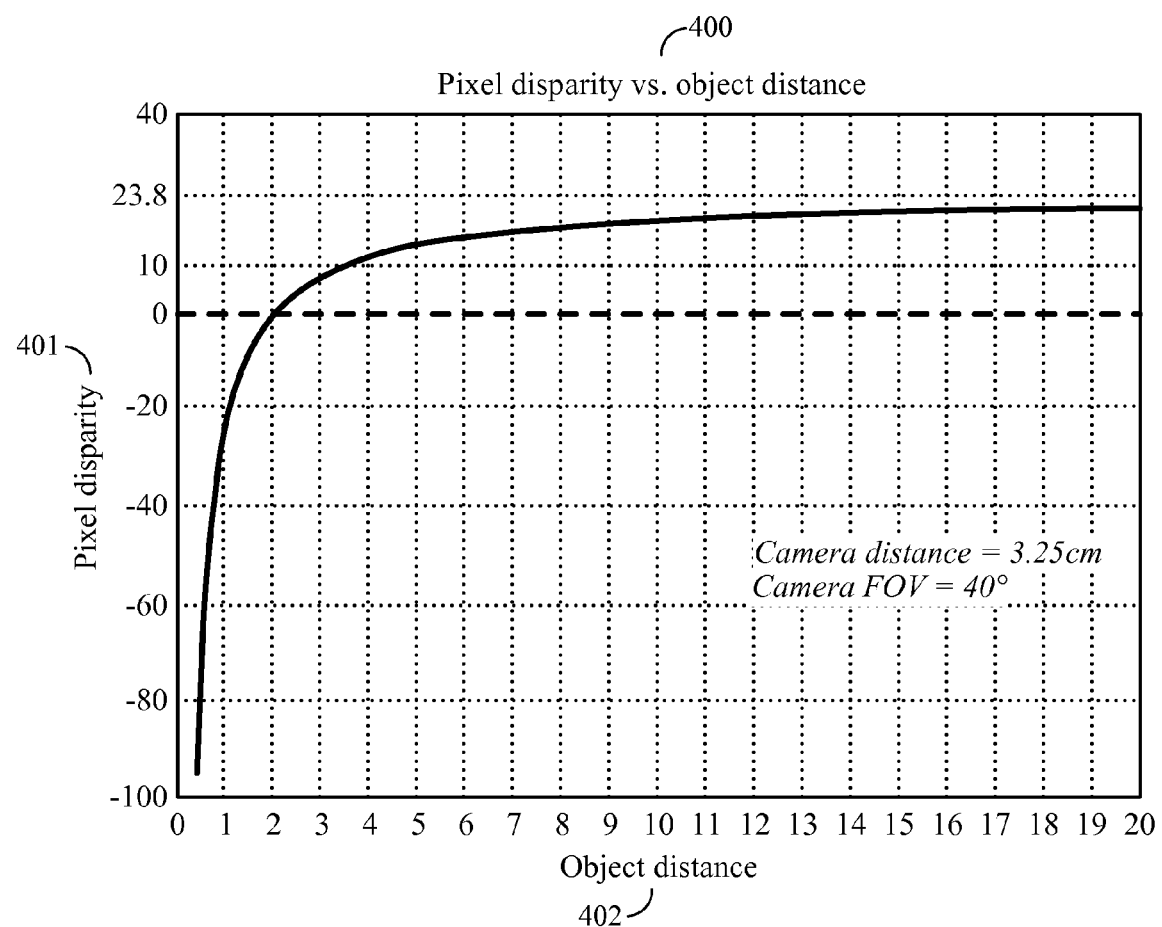
FIG. 4 is a graph depicting the relationship between object distance and pixel disparity for a particular camera arrangement.

With knowledge of the sensor positions and relative orientations one can construct a graph of the relationship between the observed disparity and an object's distance, or depth, from the camera arrangement. FIG. 4, for example, is a graph of this relationship for one particular sensor arrangement. As the disparity 401 increases, the object distance 402 increases as well. An initial negative disparity may be present for objects very near the camera arrangement, i.e. those having little depth 402 in the z-direction of FIG. 3. As the object is moved further from the camera arrangement (i.e. the depth increases) the disparity becomes increasingly positive, beginning to plateau for objects at a considerable distance. One may recognize that the chart of FIG. 4 may depend upon the angles at which sensors 301*a*, 301*b* are oriented. Similarly, though the sensors may be parallel to one another as in FIGS. 1 and 3, displacement in the z and y directions between the sensors may also result in modifications to the graph. Such a graph may be stored in memory on the device, or in a similar storage structure for quick reference.

Figure 5A:
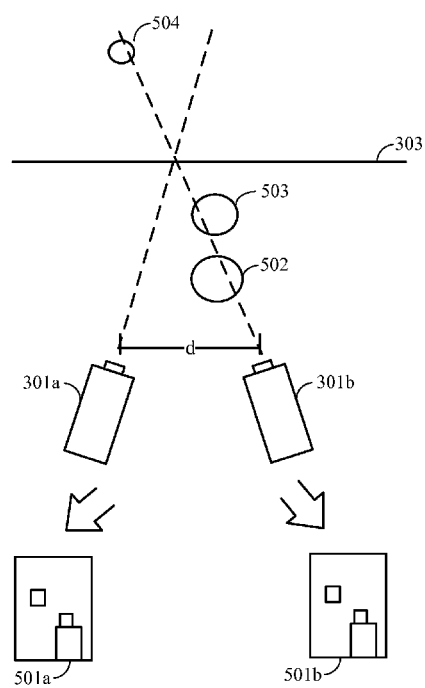
FIG. 5A is a diagram depicting a top-down view of an arbitrary scene and two image capture sensors positioned so as to achieve a stereoscopic effect.
Figure 5B:
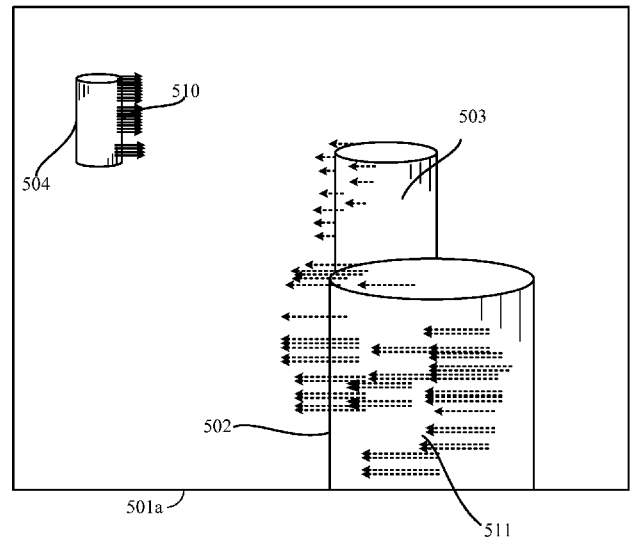
FIG. 5B depicts one of the pair of stereoscopic images taken of the scene in FIG. 5A with the magnitude and direction of object disparities in the scene overlaid.
Figure 6:
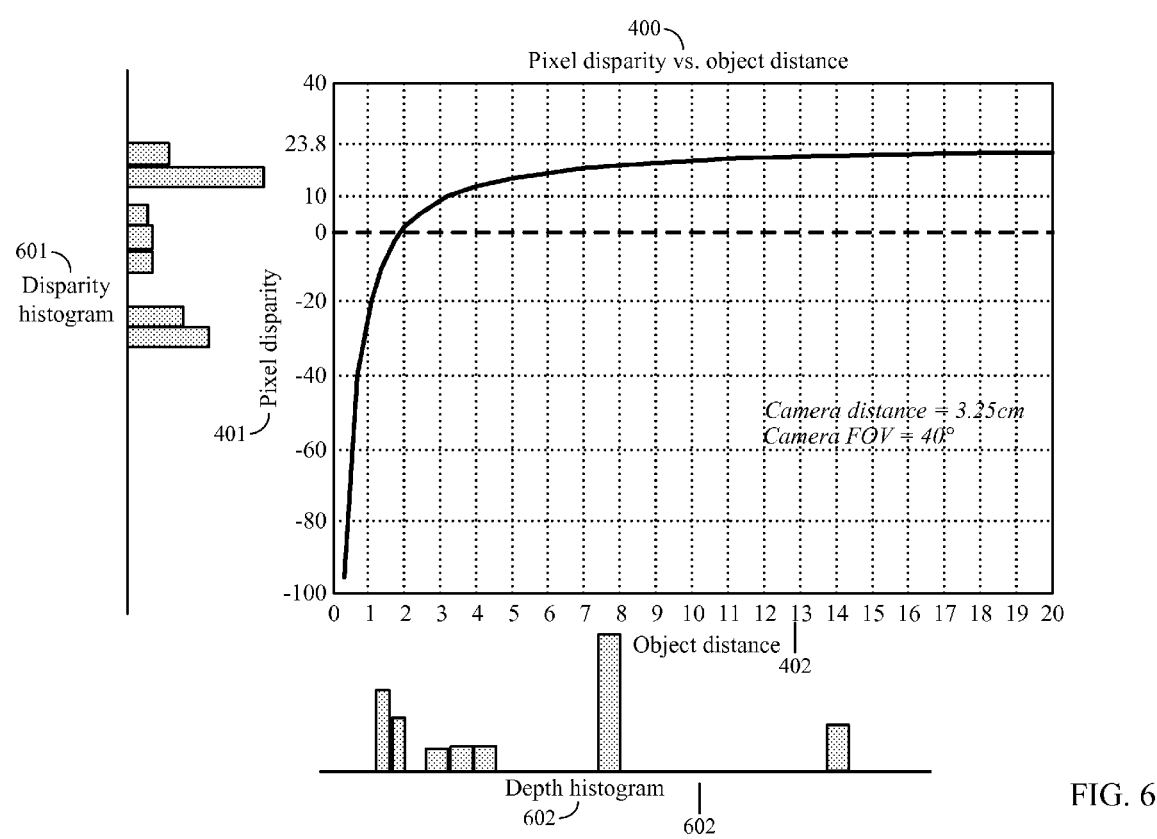
FIG. 6 depicts the graph of FIG. 4, but with an object disparity histogram and a corresponding object depth histogram overlaid.

FIG. 5*a* is a top-down view of a scene comprising several objects. Again, image capture devices 301*a* and 301*b* may be used to acquire images 501*a* and 501*b* respectively. Objects 502-504, are located at various depths within the scene. Consequently, disparities between the object positions in images 501*a* and 501*b* will be observed. FIG. 5B depicts the image 501*a* with certain of the disparity magnitudes and directions indicated at the pixel positions for which they occur. For example, a plurality of positive disparities 510 emerge for the distant object 504, and a plurality of negative disparities 511 appear for the closer object 502. With reference to the graph of FIG. 4, an automated system may determine the depth associated with each disparity. For example, as shown in FIG. 6, disparities of the same magnitude have been accumulated and plotted to form the disparity histogram 601. The corresponding depths 602 may be derived from the relationship of the sensors to generate depth histogram 602. The depth histogram 602 would suggest the presence of one or more objects in the region of each maximum at the indicated depth.

An autofocus operation comprises the determination of the proper focal depth for one or both of the sensors 101*a*, 101*b*. In some embodiments, the proper focal depth may be determined by taking the mean, median, or similar statistic of object depth histogram (or the object disparity histogram in conjunction with a graph such as FIG. 4). The median statistic provides some robustness to outlying value while a special order statistic filter may be used to accommodate a particular application. The statistic selected may depend upon the relative weights to be given very distant and very close objects. For example, focal quality may be roughly the same through one range of depths, but vary dramatically in a second range. These variations are discussed in greater detail below.

While one could generate the disparity histogram 601 by determining the disparity of every pixel for every object found in each of the first and second images, this may be computationally expensive and impractical on a mobile device. Not only would the correlation of every pixel require iterating through a substantial number of pixels, but each image may comprise multiple pixels of the same value, making identification of an individual pixel and its correlation to an object in each image difficult.

In lieu of analyzing every pixel, certain of the present embodiments contemplate creating a "sparse" disparity map or "sparse" corresponding depth map of the image contents. In certain embodiments, keypoints may be determined in each of the images and the disparities between keypoints, or between keypoints and pixels, rather than between all or most of the pixels in the images, may be used to infer object depth. Since there are fewer keypoints than pixels, the consequent disparity or depth map is "sparse". Keypoints may comprise any data structure which can be consistently replicated from a portion of an image and thereby permit unique identification of the image portion. The keypoint may be associated with a position in the image. The keypoint's unique determination permits the keypoints to be identified from similar or identical portions in a second image. In some embodiments, keypoints may comprise Scale Invariant Feature Transform (SIFT) keypoints, or keypoints of a similar feature generation module. In some embodiments, the system may reuse machine vision components preexisting in the general processor 113 or subprocessors to determine keypoints. For example, high pass filtering blocks may be reused for keypoint detection. Alternatively, software libraries for performing machine vision operations stored in memory 103 may be used to generate keypoints. In this manner, certain implementations may economically take advantage of functionality associated with other applications to generate keypoints for performing autofocus. Alternative means for determining a plurality of keypoints, such as feature generation modules employing algorithms other than SIFT, are described in greater detail below.

Figure 7:
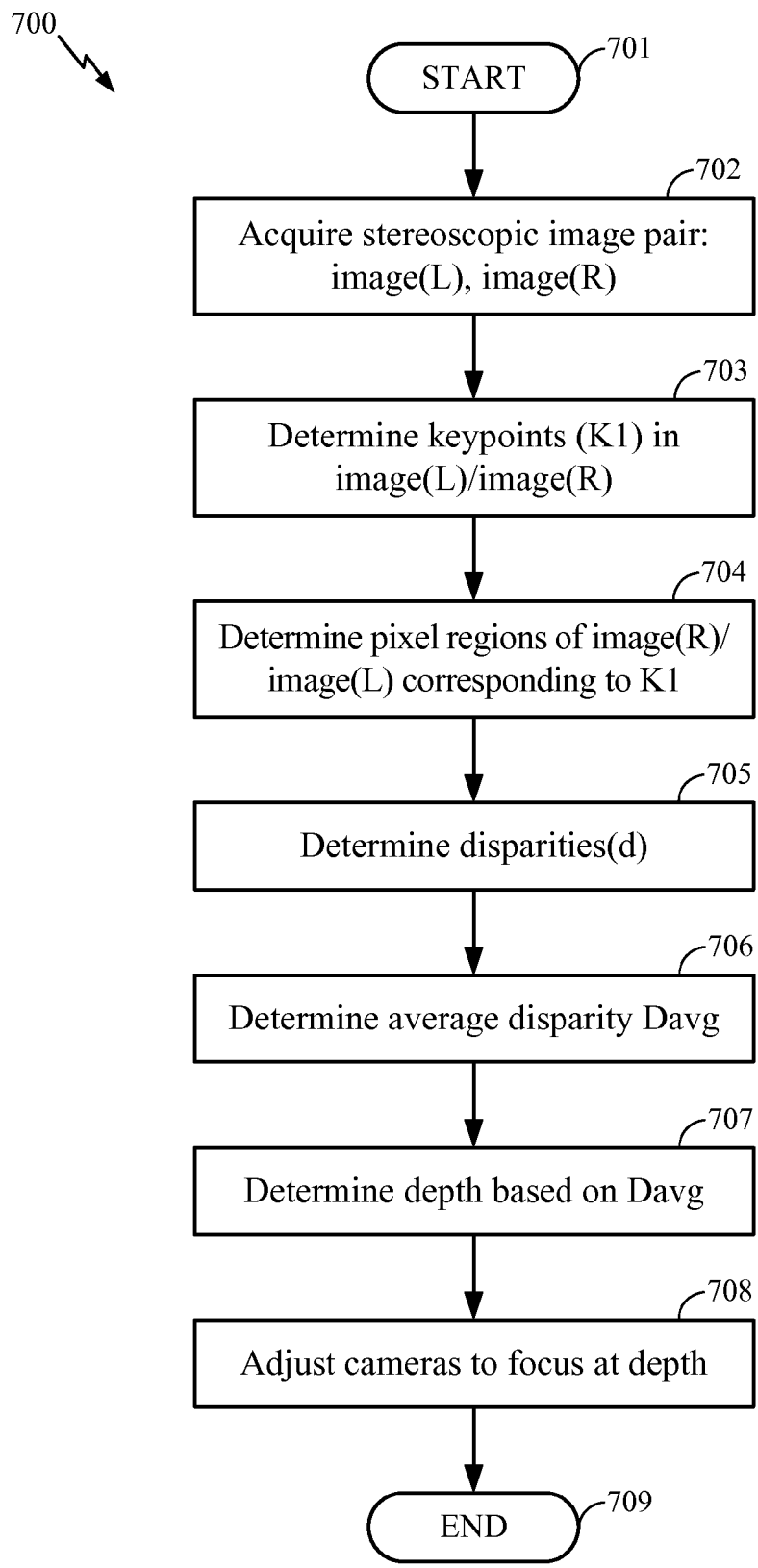
FIG. 7 depicts a flow diagram for the process by which certain embodiments determine a new focal depth.

FIG. 7 is a flow diagram depicting an autofocus process 700 for stereoscopic image capture, which may be implemented by certain of the present embodiments. The process begins 701 by acquiring, or receiving, at least a pair of stereoscopic images 702. Certain embodiments contemplate cropping a region of interest from each of the images, so as to reduce computation time. Once the images are received, the system determines keypoints from the first image 703. As mentioned, in some embodiments these keypoints may be determined using SIFT or other feature detection hardware, firmware, or software. In some embodiments, the system may also determine keypoints in the second image. The system may then correlate keypoints from the first image with pixel regions (such as a particular pixel position) in the second image 704. A "keypoint correlation" software, firmware, or hardware module may be configured to perform this operation. Certain portions of the operation may distributed among other modules (firmware, hardware, or software), creating other means for correlating keypoints. This operation may serve to identify the same image region in the first image in the second image.

Disparities D may then be calculated between each keypoint position of the first image and the correlated pixel positions of the second image 705. Where keypoints have been calculated for both images, the disparities between the keypoints may be determined by subtracting the relative positions of each of the correlated keypoints. The disparities may then be organized as a disparity histogram similar to 601 of FIG. 6 and a corresponding depth histogram, similar to histogram 602, may be determined. The depth histogram may then be used to determine the optimal focal depth for the sensor based on the selected statistic. A "disparity determination" software, firmware, or hardware module may be configured to perform this operation. Certain portions of the operation may distributed among other modules (firmware, hardware, or software), creating other means for determining disparities.

In the embodiments implementing process 700, to improve computation efficiency, the process 700 determines the statistic (in this case, the average) of the disparities 706 rather than converting to a depth for each disparity and then determining the average of the depths. Only the depth of the single statistical value need then be determined 707 with reference to a graph similar to that of FIG. 4. This depth may then be used as the new camera focus depth 708 during subsequent image captures. As mentioned, other embodiments may instead convert each of the disparities to a depth and then average the depths. Other embodiments may alternatively take the mean, median, or some other statistic to determine the desired focal depth. A "depth determination" software, firmware, or hardware module may be configured to perform this operation. The module may operate in conjunction with a disparity histogram. Certain portions of the operation may distributed among other modules (firmware, hardware, or software), creating other means for determining a focal depth. Once the focus depth has been determined, image sensor 101a may be adjusted. Sensor 101b may also be adjusted by the processor 113, or sensor 101b may track the focal depth of sensor 101a independently. As mentioned above, in certain embodiments, only a single sensor may be adjusted based upon the determined focal depth.

In variations of these embodiments, the system may alternatively use information from the scene to determine the depth, rather than simply take the average of the disparities. For example, in lieu of taking the average, keypoint disparities may be weighted based upon their presence in a single object and upon lighting conditions. For example, the histograms may be enhanced by weighting each point from the histogram by the focal quality associated with a certain focus distance. In certain camera arrangements if the focal point was set to 3 meters, objects between 2 m and infinity may have good focus, objects between 1 m-2 m may have fair focus, and objects between 0.5-1 m may have bad focus. The histograms of FIG. 6 would accordingly be weighted so that a preferred focal range was selected more often than the other ranges. This may be referred to as a "region weighted saliency" in certain embodiments. In other variations, frequency information from the image may be incorporated into the keypoints selection. Objects comprising textures may generate more keypoints than objects without textures or with little texture, and thereby affect the average. Accordingly, keypoints associated with textured objects may receive different weights from non-textured objects. In one variation, regions within a texture may be detected and these regions then used so as to lower the weight for keypoints in that region.

When capturing a stereoscopic movie, the process 700 may be applied to a single frame, i.e. a single pair of stereoscopic images. The determined focal depth may then be used by the image sensors during subsequent image captures until the camera arrangement or scene is modified so as to necessitate reassessment of the proper focus. The operation 700 therefore has the benefit that there need not be any state dependency. That is, a traditional auto-focus system would need to periodically time-out the movie capture process and capture multiple focal depths to reassess the focus. Process 700, in contrast, may be "instantaneous" in that it produces no frame delay. This facilitates seamless focus tracking. The process may further guarantee system stability, as there is no feedback (or dependency) between the current focus position and the focus position estimation. Additionally, since the focus operation may be accomplished with a single frame, the user's hand motion will be less likely to generate any blur.

Figure 8:
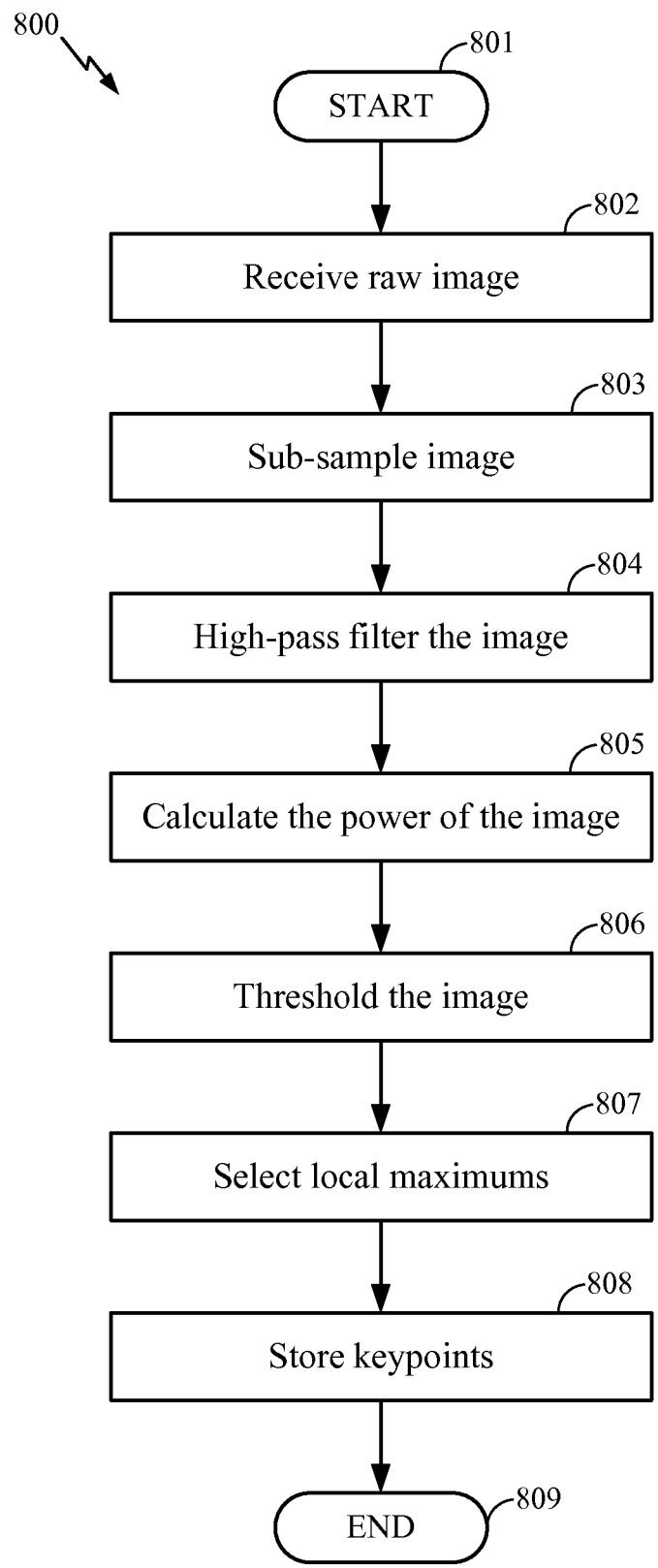
FIG. 8 depicts a flow diagram for the process by which certain of the embodiments determine keypoints.

As mentioned, the keypoints generated in steps 703 and 704 of process 700 may comprise any data structure which can assign an identity to a portion of the image and be consistently recognized when applied to the second image. As mentioned, in some embodiments the keypoints may comprise Scale Invariant Feature Transform (SIFT) keypoints generated from a SIFT feature generation module. FIG. 8 depicts another possible process for generating keypoints in a feature generation module.

The process 800 begins 801 by receiving 802 one of the pair of raw stereoscopic images. The image may then be subsampled 803, possibly to improve the algorithm's robustness to noise and to decrease computational demands. The image may then be passed through a horizontal high pass filter 804. In some embodiments, the filter may comprise a 3×4 kernel with a response given by $$h = \begin{bmatrix} -1 & -1 & 1 & 1 \\ -1 & -1 & 1 & 1 \\ -1 & -1 & 1 & 1 \end{bmatrix}$$

The process may then calculate the power 805 of the image, i.e. by taking the square of each value. Finally, the process may threshold the values 806 to eliminate noise and low-power values. From among the remaining values which exceeded the threshold, the system will identify "maximum values". In some embodiments the maximum values may be those image portions which exceeded the threshold, while in other embodiments the maximum values may be defined relative to their local neighbors. For example, the delta between neighboring pixels exceeding the threshold may be used to identify a maximum value. The identified maximum values represent keypoint positions which may be used for the disparity determination steps described above. The system may store these keypoint positions 807 before ending 808. By subsampling and thresholding the image in this manner the computation time required to determine pixel locations which may serve as keypoints may be reduced. As a keypoint in these embodiments comprises a pixel position, the pixel position may occasionally be referred to as a "keypoint". However, one will readily recognize variations, wherein keypoints comprise both a position and an array of the neighboring pixel values and positions. Keypoints may also refer to frequency content of an image portion or to gradients in pixel value, rather than to pixel values or pixel positions directly. SIFT keypoints, for example, may comprise a vector indicating the pixel gradient.

Figure 9:
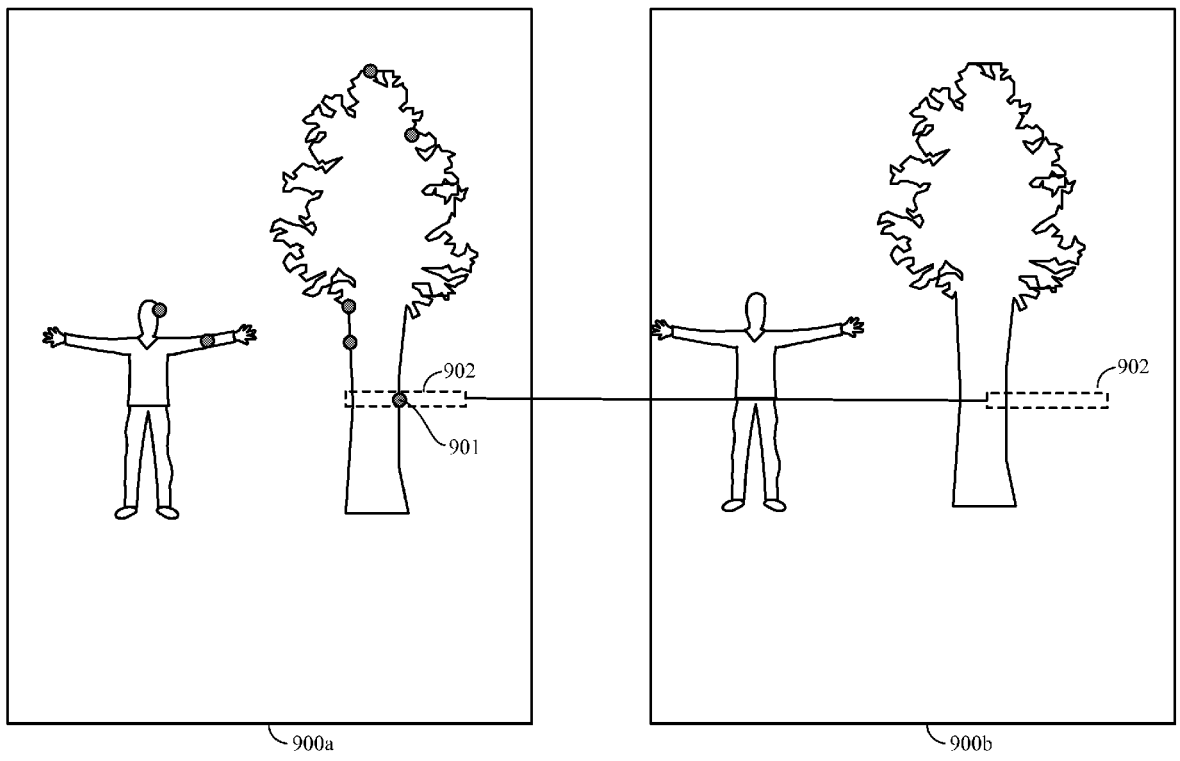
FIG. 9 depicts a stereoscopic image pair and a region in which keypoints are correlated between each of the images.

Once the keypoints in the first image have been determined, it may still remain to correlate the keypoints with positions in the second image so that the disparities between image portions may be determined. A possible method for determining whether keypoints, such as the keypoints generated by the process 800 of FIG. 8, are correlated with a position in an image will now be described with respect to FIG. 9. FIG. 9 depicts stereoscopic image pair 900a and 900b. Based on the configuration of the two sensors used to capture images 900a and 900b, a search region 902 around each keypoint 901 may be determined. The search region 902 may specify the maximum distance a keypoint may be displaced in the left and right images (i.e., a maximum expected disparity) as a consequence of the capture device configuration. In some embodiments, as the image sensors may lack vertical disparity, keypoints 901 may generally lie on vertical edges in the scene.

Search region 902 is located in the same absolute position of each of images 900a and 900b. In FIG. 9, search region 902 comprises a rectangle having the height of a single pixel, since it is assumed that no vertical disparity between images 900a and 900b exists (i.e. only pixels in a same row are considered). The height of the region 902 may be increased in relation to the amount of vertical disparity that may be present between images 900a and 900b. The system may iterate through each pixel in the search region 902 of the second image 900b and determine the pixel's correspondence with the portions of image 900a surrounding the keypoint 901. This may be accomplished in some embodiments using a correlation metric described in further detail below.

In certain embodiments, keypoints may have been determined for both image 900a and image 900b, rather than simply for image 900a. When attempting to correlate keypoints between the images, the system may identify keypoints within the search region 902 in the second image 900b. If only one keypoint of image 900b is found in search region 902, this keypoint may be correlated with the keypoint 901 from the first image. Where more than one keypoint of image 900b is present in the region 902, the system may apply a correlation metric to each keypoint of image 900b in the search region 902 to determine which keypoint best corresponds with the keypoint 901 from the first image. As with metrics applied when keypoints are taken for only one image, the metric may consider pixel values neighboring the pixel positions of keypoints 901 and 901b to verify that keypoints 901 and 901b are more likely to refer to the same portion of the scene in each of images 900a and 900b. Where keypoints are created for both images, it may be necessary only to iterate between keypoints in the region 902 rather than between each pixel within the region.

In the embodiments described above, the system iterates through certain of the pixels in the search region 902 corresponding to the determined keypoint 901. The system may apply a correlation metric to each pixel in the region 902. The pixel in the region 902 having the maximum correlation with the region surrounding the position of keypoint 901 may then be correlated with the keypoint 901. The computational cost to iterate through each pixel of image 900b in the range 902 may be less than the cost to compute keypoints for all of image 900b and to then determine the correlations between each keypoint. In some embodiments, however, where only a few keypoints have been generated, the system may determine correlations between all the keypoints directly, rather than iterate between regions 902 associated with the keypoints of one image.

In certain embodiments, the correlation metric used to identify a keypoint or pixel position in image 900b corresponding to a keypoint in 900a may comprise the calculation of the mean square error for pixels surrounding a position in image 900b under consideration and the pixels surrounding the keypoint position in image 900a. That is, the mean square error of pixels neighboring keypoint 901 of the first image and the neighboring pixels for positions in search region 902 in image 900b may be used as a correlation metric. The mean square error may be calculated as:

$$R(\Delta) = \sum_{i=-3}^{3} \sum_{j=-3}^{3} (S_{left}(i+M, j+N) - S_{right}(i+M+\Delta, j+N))^2$$

where R is the mean squared error, $S_{left}$ comprises the pixel values in the image 900a, $S_{right}$ comprises the pixel values in the image 900b, M and N comprise the horizontal and vertical offsets into the image to the region 902 for the current keypoint or pixel position of region 902 under investigation, and $\Delta$ comprises the horizontal shift applied for the current position in the search region 902 (the first parameter to $S_{left}$ and $S_{right}$ is a column position/x-axis and the second a row position/y-axis). Although the mean squared error is within a 7×7 window in the above example, one may readily envision a range of window dimensions depending upon the resolution of the image and the sub-sampling applied. Furthermore, as sensors 101a and 101b are presumed not to have any vertical disparity in the above example, the search region 902 extends only horizontally and $\Delta$ appears only in the x-axis/column direction. More robust systems may compensate for errors in sensor positioning by increasing the height of the search region 902 and including a $\Delta$ in the vertical direction. As the image has been downsampled, sub pixel resolution may be determined using interpolation, such as polynomial interpolation, in some embodiments to facilitate more accurate determinations of the pixel in region 902 of image 900b correlated with the keypoint 901. That is, the displacement of sensor 101b relative to sensor 101a may not be an exact, integer number of pixels. Thus, particularly after sub-sampling, accurate correlation of the keypoint 901 may require including locations between pixels in the search region 902. The, position in region 902 of image 900b maximally correlated with keypoint 901 may fall between pixel positions, at an interpolated point.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

We claim:

1. A method in an electronic device for determining a focal depth for an image sensor, comprising:
   receiving a first image in the visible spectrum, the first image associated with a first viewpoint;
   receiving a second image in the visible spectrum, the second image associated with a second viewpoint;
   determining a first plurality of keypoints based on the first image;
   correlating keypoints from the first plurality of keypoints with positions in the second image;
   determining a plurality of disparities associated with each of the first plurality of keypoints to form a sparse depth map; and
   determining a focal depth for capturing a third image in the visible spectrum based upon the sparse depth map, the position of the first viewpoint and the position of the second viewpoint.

2. The method of claim 1, further comprising determining a second plurality of keypoints based on the second image.

3. The method of claim 2, wherein correlating keypoints from the first plurality of keypoints with positions in the second image comprises correlating keypoints from the first plurality of keypoints with keypoints from the second plurality of keypoints.

4. The method of claim 1, wherein correlating keypoints from the first plurality of keypoints with positions in the second image comprises iterating over pixels within a search range in the second image.

5. The method of claim 4, wherein correlating keypoints from the first plurality of keypoints with positions in the second image comprises determining the mean square error between pixels in the first image and the second image.

6. The method of claim 1, wherein determining a first plurality of keypoints based on the first image comprises determining Scale Invariant Feature Transform (SIFT) keypoints based on the first image.

7. The method of claim 1, wherein determining a first plurality of keypoints based on the first image comprises sub-sampling the first image, applying a high-pass filter to the first image, calculating the power of the first image, and thresholding the first image.

8. The method of claim 1, wherein correlating keypoints from the first plurality of keypoints with positions in the second image occurs in realtime.

9. The method of claim 1, wherein the electronic device comprises a mobile phone.

10. A non-transitory computer readable medium comprising instructions configured to cause a computer to perform the steps of:
   receiving a first image in the visible spectrum, the first image associated with a first viewpoint;
   receiving a second image in the visible spectrum, the second image associated with a second viewpoint;
   determining a first plurality of keypoints based on the first image;
   correlating keypoints from the first plurality of keypoints with positions in the second image;
   determining a plurality of disparities associated with each of the first plurality of keypoints to form a sparse depth map; and
   determining a focal depth for capturing a third image in the visible spectrum based upon the sparse depth map, the position of the first viewpoint and the position of the second viewpoint.

11. The non-transitory computer readable medium of claim 10, further comprising determining a second plurality of keypoints based on the second image.

12. The non-transitory computer readable medium of claim 11, wherein correlating keypoints from the first plurality of keypoints with positions in the second image comprises correlating keypoints from the first plurality of keypoints with keypoints from the second plurality of keypoints.

13. The non-transitory computer readable medium of claim 10, wherein correlating keypoints from the first plurality of keypoints with positions in the second image comprises iterating over pixels within a search range in the second image.

14. The non-transitory computer readable medium of claim 13, wherein correlating keypoints from the first plurality of keypoints with positions in the second image comprises determining the mean square error between pixels in the first image and the second image.

15. The non-transitory computer readable medium of claim 10, wherein determining a first plurality of keypoints based on the first image comprises determining Scale Invariant Feature Transform (SIFT) keypoints based on the first image.

16. The non-transitory computer readable medium of claim 10, wherein determining a first plurality of keypoints based on the first image comprises sub-sampling the first image, applying a high-pass filter to the first image, calculating the power of the first image, and thresholding the first image.

17. The non-transitory computer readable medium of claim 10, wherein correlating keypoints from the first plurality of keypoints with positions in the second image occurs in realtime.

18. The non-transitory computer readable medium of claim 10, wherein the computer is located in a mobile phone.

19. A system for focusing a stereoscopic capture device, the system comprising:
   a first image sensor configured to generate a first image in the visible spectrum, the first image associated with a first viewpoint;
   a second image sensor configured to generate a second image in the visible spectrum, the second image associated with a second viewpoint;
   a feature generation module configured to determine a first plurality of keypoints based on the first image;
   a keypoint correlation module configured to correlate keypoints from the first plurality of keypoints with positions in the second image;

a disparity determination module configured to determine a plurality of disparities associated with each of the first plurality of keypoints to form a sparse depth map; and a depth determination module configured to determine a focal depth for capturing a third image in the visible spectrum based upon the sparse depth map, the position of the first viewpoint and the position of the second viewpoint.

20. The system of claim 19, wherein the feature generation module is configured to determine a second plurality of keypoints based on the second image.

21. The system of claim 20, wherein the module configured to correlate keypoints is configured to correlate keypoints from the first plurality of keypoints with keypoints from the second plurality of keypoints.

22. The system of claim 19, wherein the module configured to correlate keypoints is configured to iterate over pixels within a search range in the second image.

23. The system of claim 22, wherein correlating keypoints from the first plurality of keypoints with positions in the second image comprises determining the mean square error between pixels in the first image and the second image.

24. The system of claim 19, wherein the feature generation module is configured to determine Scale Invariant Feature Transform (SIFT) keypoints based on the first image.

25. The system of claim 19, wherein the feature generation module is configured to sub-sample the first image, apply a high-pass filter to the first image, calculate the power of the first image, and threshold the first image.

26. The system of claim 19, wherein the module configured to correlate keypoints correlates keypoints from the first plurality of keypoints with positions in the second image in realtime.

27. The system of claim 19, wherein the stereoscopic capture device is located on a mobile phone.

28. The system of claim 19, wherein the module configured to determine a focal depth comprises a disparity histogram.

29. A system for focusing a stereoscopic capture device, the system comprising:
means for receiving a first image in the visible spectrum, the first image associated with a first viewpoint;
means for receiving a second image in the visible spectrum, the second image associated with a second viewpoint;
means for determining a first plurality of keypoints based on the first image;
means for correlating keypoints from the first plurality of keypoints with positions in the second image;
means for determining a plurality of disparities associated with each of the first plurality of keypoints to form a sparse depth map; and
means for determining a focal depth for capturing a third image in the visible spectrum based upon the sparse depth map, the position of the first viewpoint and the position of the second viewpoint.

30. The system of claim 29, wherein the means for receiving a first image comprises a first sensor, the means for receiving a second image comprises a second sensor, the means for determining a first plurality of keypoints comprises a feature generation module, the means for correlating comprises a keypoint correlation module, the means for determining a plurality of disparities comprises a disparity determination module, and the means for determining a focal depth comprises a depth determination module.

31. The system of claim 29, wherein the means for determining a first plurality of keypoints is configured to determine a second plurality of keypoints based on the second image.

32. The system of claim 31, wherein the means for correlating keypoints from the first plurality of keypoints with positions in the second image is configured to correlate keypoints from the first plurality of keypoints with keypoints from the second plurality of keypoints.

33. The system of claim 29, wherein the means for correlating keypoints from the first plurality of keypoints with positions in the second image is configured to iterate over pixels within a search range in the second image.

34. The system of claim 33, wherein the means for correlating keypoints from the first plurality of keypoints with positions in the second image is configured to determine the mean square error between pixels in the first image and the second image.

35. The system of claim 29, wherein the means for determining a first plurality of keypoints is configured to determine Scale Invariant Feature Transform (SIFT) keypoints based on the first image.

36. The system of claim 29, wherein the means for determining a first plurality of keypoints is configured to sub-sample the first image, apply a high-pass filter to the first image, calculate the power of the first image, and threshold the first image.

37. The system of claim 29, wherein the means for correlating keypoints correlates the keypoints from the first plurality of keypoints with positions in the second image in realtime.

38. The system of claim 29, wherein the stereoscopic capture device is located on a mobile phone.

* * * * *